(12) United States Patent
Naribole et al.

(10) Patent No.: US 11,452,116 B2
(45) Date of Patent: Sep. 20, 2022

(54) APPARATUS AND METHOD FOR MULTI-LINK OPERATION BY ACCESS POINT WITH SIMULTANEOUS TRANSMIT-RECEIVE CONSTRAINTS

(71) Applicant: Samsung Electronics Co., Ltd., Gyeonggi-do (KR)

(72) Inventors: Sharan Naribole, San Jose, CA (US); Srinivas Kandala, Morgan Hill, CA (US); Ashok Ranganath, Los Gatos, CA (US)

(73) Assignee: Samsung Electronics Co., Ltd

( * ) Notice: Subject to any disclaimer, the term of this patent is extended or adjusted under 35 U.S.C. 154(b) by 39 days.

(21) Appl. No.: 17/170,370

(22) Filed: Feb. 8, 2021

(65) Prior Publication Data

US 2022/0116955 A1    Apr. 14, 2022

Related U.S. Application Data

(60) Provisional application No. 63/089,330, filed on Oct. 8, 2020.

(51) Int. Cl.
*H04W 72/12* (2009.01)
*H04W 88/08* (2009.01)
*H04W 74/08* (2009.01)

(52) U.S. Cl.
CPC ....... *H04W 72/12* (2013.01); *H04W 74/0808* (2013.01); *H04W 88/08* (2013.01)

(58) Field of Classification Search
CPC .................................................... H04W 72/12
See application file for complete search history.

(56) References Cited

U.S. PATENT DOCUMENTS

| 8,351,390 | B2 | 1/2013 | Gaur |
| 9,572,114 | B2 | 2/2017 | Chen et al. |
| 2010/0070838 | A1 | 3/2010 | Cooper et al. |
| 2012/0124632 | A1 | 5/2012 | Rothschild et al. |
| 2019/0174508 | A1 | 6/2019 | Wang et al. |

OTHER PUBLICATIONS

D. Stanley and J. Pane, "Press Release for TGbe," IEEE 802.11-19/1395r1, 2019.
S. Naribole, W. Lee, and A. Ranganath, "Impact of MU EDCA channel access on IEEE 802.11ax WLANs," in Proc. of IEEE VTC Fall, 2019.
E. Khorov, A. Kiryanov, A. Lyakhov, and G. Bianchi, "A Tutorial on IEEE 802.11ax High Efficiency WLANs," IEEE Communications Surveys & Tutorials, 2018.

(Continued)

*Primary Examiner* — Angel T Brockman
(74) *Attorney, Agent, or Firm* — The Farrell Law Firm, P.C.

(57) ABSTRACT

Methods and apparatuses are provided for a medium access protocol at non-simultaneous transmission and reception (STR) access points (APs) and end user devices (STAs). A method performed by a non-STR MAP includes identifying a medium state of a first channel of the MAP; and adapting transmission on a second channel of the MAP, based on the identified medium state of the first channel.

20 Claims, 6 Drawing Sheets

(56) References Cited

OTHER PUBLICATIONS

"IEEE Draft Standard for Information Technology—Telecommunications and Information Exchange Between Systems and Local and Metropolitan Area Networks—Specific Requirements Part 11: Wireless LAN Medium Access Control (MAC) and Physical Layer (PHY) Specifications Amendment Enhancements for High Efficiency WLAN," IEEE P802.11ax/D6.1, 2020.

D. Lopez-Perez, A. Garcia-Rodriguez, L. Galati-Giordano, M. Kasslin, and K. Doppler, "IEEE 802.11be Extremely High Throupghput: The Next Generation of Wi-Fi Technology Beyond 802.11ax," IEEE Communications Magazine, vol. 57, No. 9, pp. 113-119, Sep. 2019.

E. Khorov, I. Levitsky, and I. F. Akyildiz, "Current Status and Directions of IEEE 802.11be, the Future Wi-Fi 7," IEEE Access, vol. 8, pp. 88 664-88 688, 2020.

H. Han, Y. Liu, G. Shen, Y. Zhang, and Q. Li, "DozyAP: power-efficient Wi-Fi tethering," in Proc. of ACM MobiSys, 2012.

K. Jung, Y. Qi, C. Yu, and Y. Suh, "Energy efficient wifi tethering on a smartphone," in Proc. of IEEE INFOCOM, 2014.

A. Pal, M. Raj, K. Kant, and S. Das, "A Smartphone-based Network Architecture for Post-disaster Operations Using WiFi Tethering," ACM Transactions on Internet Technology (TOIT), vol. 20, No. 1, pp. 1-27, 2020.

Y. He, M. Chen, B. Ge, and M. Guizani, "On WiFi offloading in heterogeneous networks: Various incentives and trade-off strategies," IEEE Communications Surveys & Tutorials, vol. 18, No. 4, pp. 2345-2385, 2016.

J. Jiang, "Operation with Non-STR AP," IEEE 802.11-20/755r1, 2020.

E. Au, "Specification Framework for TGbe," IEEE 802.11-19/1262r15, 2020.

"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE Std 802.11-2016 (Revision of IEEE Std 802.11-2012), 2016.

S. Naribole, S. Kandala, W. Lee, and A. Ranganath, "Simultaneous Transmit-Receive Multi-Channel Operation in Next Generation WLANs," in Proc. of IEEE WCNC, 2020.

S. Naribole, S. Kandala, W. Lee, and A. Ranganath, "Simultaneous Multi-Channel Downlink Operation in Next Generation WLANs," in Proc. of IEEE GLOBECOM (to appear), 2020.

D. Akhmetov, L. Cariou, and D. Das, "Discussion on Methods for Synchronous ML operations," IEEE 802.11-20/993r7, 2020.

N. Choi, Y. Seok, and Y. Choi, "Multi-channel MAC protocol for mobile ad hoc networks," in Proc. of IEEE VTC Fall, 2003.

D. Dang, M. Van Nguyen, C. Hong, S. Lee, and K. Chung, "An energy efficient multi-channel mac protocol for wireless ad hoc networks," in Proc. of IEEE GLOBECOM, 2012.

C. Cordeiro and K. Challapali, "C-MAC: A Cognitive MAC Protocol for Multi-Channel Wireless Networks," in Proc. of IEEE International Symposium on New Frontiers in Dynamic Spectrum Access Networks, 2007.

O. Bejarano, E. Knightly, and M. Park, "IEEE 802.11ac: from channelization to multi-user MIMO," IEEE Communications Magazine, vol. 51, No. 10, pp. 84-90, Oct. 2013.

A. Zakrzewska and L. Ho, "Dynamic Channel Bandwidth Use Through Efficient Channel Assignment in IEEE 802.11ac Networks," in Proc. of IEEE VTC Fall, 2019.

T. Nitsche, A. Flores, E. Knightly, and J. Widmer, "Steering with eyes closed: mm-wave beam steering without in-band measurement," in Proc. of IEEE INFOCOM, 2015.

S. Naribole, S. Chen, E. Heng, and E. Knightly, "LiRa: a WLAN architecture for Visible Light Communication with a Wi-Fi uplink," in Proc. of IEEE SECON, 2017.

APPARATUS AND METHOD FOR MULTI-LINK OPERATION BY ACCESS POINT WITH SIMULTANEOUS TRANSMIT-RECEIVE CONSTRAINTS

PRIORITY

This application is based on and claims priority under 35 U.S.C. § 119(e) to U.S. Provisional Patent Application Ser. No. 63/089,330, which was filed in the U.S. Patent and Trademark Office on Oct. 8, 2020, the entire content of which is incorporated herein by reference.

FIELD

The present disclosure relates generally to a medium access protocol at non-simultaneous transmission and reception (STR) access points (APs) and end user devices (STAs), and more particularly, to operations that allow STAs to operate on and non-STR APs to utilize medium on any available links.

BACKGROUND

The IEEE 802.11 Working Group recently established the IEEE 802.11be project, which focuses on improved throughput performance in existing Wireless local area network (WLAN) applications in order to meet growing industry demands for low latency and high reliability applications over WLANs. IEEE 802.11be represents the next-generation standard beyond the current capabilities of IEEE 802.11ax. Concurrently, there has been an emergence of 802.11 devices with multiple radios, both STAs and APs, capable of operating simultaneously on multiple channels possibly distributed over multiple bands such as 2.4 GHz, 5 GHz, and 6 GHz available for unlicensed operation. Multi-channel operation within the same 802.11 network (or basic service set (BSS)) has the potential to (a) improve throughput, as frames from a traffic session can be transmitted on multiple channels providing increased bandwidth, (b) reduce latency, as devices contend on multiple channels and utilize the first available channel, (c) increase reliability, as frames can be duplicated over multiple channels, and (d) enable flexible channel switching without negotiation overhead. Accordingly, multi-channel/multiband operation is currently being discussed in the IEEE 802.11be task group. Multi-channel/multiband operation represents a paradigm shift moving from a BSS operating on a single channel to a BSS operating over multiple channels, wherein the STAs can dynamically choose to operate on a subset of channels ranging from a single channel to multiple channels.

Due to the constantly increasing demand for Wi-Fi connectivity, there is an increasing number of STA devices, such as smartphones and tablets, being equipped with Mobile AP (MAP) functionality, also known as soft APs, personal hotspots, and mobile hotspots. MAP has gained popularity as a convenient, on-the-move, and cost-effective wireless Internet access feature. In this operating mode, the STA establishes a BSS to operate as a Wi-Fi AP, which nearby devices can discover and associate. Typically, MAP utilizes an in-device cellular interface (e.g. 4G/5G) as a backhaul to Internet.

With the advent of IEEE 802.11be multi-channel operation, multi-channel MAP operation is also of high interest in research and industry. In order to support both next-generation 802.11be devices that can operate on newly unlicensed 6 GHz spectrum, as well as legacy devices that normally operate on 2.4 GHz and 5 GHz bands, 802.11be STAs may operate in MAP mode by establishing a BSS including channels in 2.4 GHz, 5 GHz, and 6 GHz bands.

To realize the full potential of multi-channel operation, in reference to a pair of channels, an ideal requirement from the participating devices would be having the capability to perform reception on one channel while simultaneously transmitting on the other channel (i.e., STR capability). The STR capability on a pair of channels may be determined by several factors of radio design and BSS operation including channels of operation, bandwidth of each channel, transmit power limit, antenna distribution between the channels, etc. Therefore, a multi-radio device may lack the STR capability for particular channel combinations. Due to smaller size and simpler design than a traditional AP, an STA, and therefore corresponding MAP, might lack STR capability for a particular set of operating channels. For example, due to insufficient frequency separation, STAs and MAPs operating simultaneously on 5 GHz and 6 GHz bands might lack STR capability. Herein, a multi-radio device that lacks STR capability will be referred to as a non-STR device.

Independent medium access on each channel in an asynchronous operation can lead to the scenario in which a non-STR MAP is transmitting to a first STA on one channel, and another STA is transmitting to the non-STR MAP on a second channel. In a dense network, this scenario may occur frequently and lead to performance degradation for both multi-channel STAs devices as well as single-channel devices. Single channel STAs, e.g., legacy devices, might not be aware of an associated MAP's multichannel operation and/or its lack of STR capability.

SUMMARY

The present disclosure is provided to address at least the problems and/or disadvantages described above and to provide at least the advantages described below.

An aspect of the disclosure is to provide an apparatus system and method for minimizing performance degradation in an asynchronous multi-channel MAP operation due to MAP's simultaneous transmit-receive constraints.

Another aspect of the disclosure is to provide an apparatus system and method that addresses simultaneous transmit-receive constraints and provides: (a) opportunistic alignment of simultaneous downlink transmissions to maximize downlink throughput and prevent reception failure at a MAP, (b) mandatory ending alignment of downlink transmissions on a single channel with an out-of-network frame exchange sequence identified on another channel, and (c) an access recess mechanism applied by STAs to minimize performance degradation resulting from a MAP's STR constraint.

According to one embodiment, a method is provided for a non-STR MAP. The method includes identifying a medium state of a first channel of the MAP; and adapting transmission on a second channel of the MAP, based on the identified medium state of the first channel.

According to one embodiment, a non-STR MAP is provided, which includes a transceiver; and a processor configured to identify a medium state of a first channel of the MAP, and adapt transmission on a second channel of the MAP, based on the identified medium state of the first channel.

According to one embodiment, a method is provided for a non-STR STA. The method includes transmitting, on a first channel, to a mobile access point (MAP), a request to send (RTS) message; identifying that no clear to send (CTS) message is received from the MAP, in response to transmitting the RTS message; identifying that a medium state of the first channel is idle; and activating a recess timer countdown, in response to identifying that no CTS message is received and that the medium state of the first channel is idle.

According to one embodiment, a non-STR STA is provided, which includes a transceiver; and a processor configured to transmit, via the transceiver, on a first channel, to a mobile access point (MAP), a request to send (RTS) message; identify that no clear to send (CTS) message is received from the MAP, in response to transmitting the RTS message; identify that a medium state of the first channel is idle; and activate a recess timer countdown, in response to identifying that no CTS message is received and that the medium state of the first channel is idle.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, an STA, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

A. Multi-Channel BSS Model

A MAP may establish a BSS operation over multiple channels. These channels may be located on different bands, although a subset of the channels may be on the same band. For example, a multi-channel BSS includes 80 MHz operation in a 5 GHz band and 160 MHz operation in a 6 GHz band. Due to the diversity in channel conditions across the channels, a data rate used by a device might be different on different channels. The MAP advertises multichannel operation in broadcast frames such as beacons, probe responses, etc.

STAs joining the BSS may indicate the channels they want to operate on, during association or dynamically, in the form of an operating mode change indication, after association. For example, an STA may temporarily switch to a single channel operation for power saving when it has no backlogged traffic or for co-existence with other technologies (e.g., Bluetooth). For simplicity, MAP operations are described herein over two channels.

Consequently, a BSS operated by a MAP is composed of STAs operating on one of the channels or on both the channels.

This disclosure focuses on a multi-channel operating scenario, wherein a MAP and associated multi-channel STAs are non-STR devices. Although a non-STR device cannot simultaneously transmit and receive over the multiple channels, it can still simultaneously transmit or simultaneously receive over multiple channels.

B. Multi-Channel Medium Access

By default, a medium access in each channel is independent of a medium state of other channels.

Figure 1:
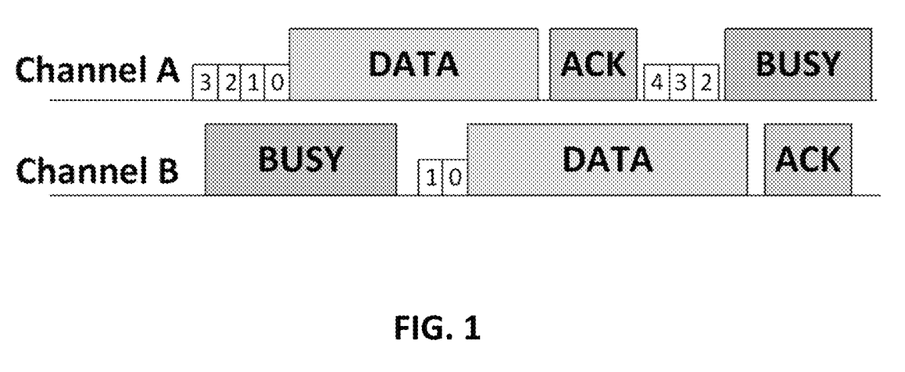
FIG. 1 illustrates multichannel medium access from a perspective of a STR AP.

FIG. 1 illustrates multichannel medium access from a perspective of a STR AP operating on channels A and B. Specifically, FIG. 1 highlights an asynchronous nature of the medium access, wherein an STR AP simultaneously transmits on channel A and receives on channel B.

Referring to FIG. 1, the boxed numbers represent 802.11 backoff counter values. An 802.11 transmission opportunity period (TXOP), in its simplest form, includes a data transmission and its corresponding acknowledgement (ACK). Upon decoding a duration field in a MAC header of any frame part of the TXOP, neighboring devices update their 802.11 network allocation vector (NAV) and defer medium access until the NAV expires. As illustrated in FIG. 1, a TXOP on a channel begins when the backoff counter reaches zero.

Figure 2:
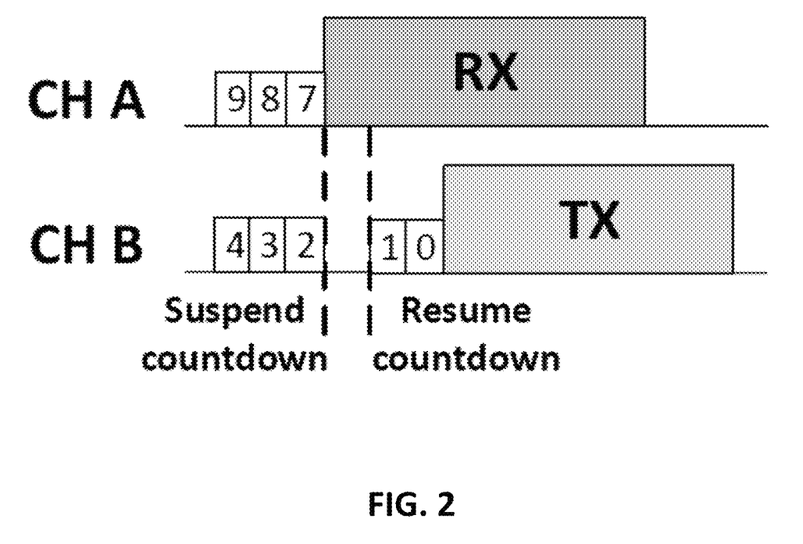
FIG. 2 illustrates an opportunistic backoff by a non-STR device.

FIG. 2 illustrates an opportunistic backoff by a non-STR device.

Referring to FIG. 2, a non-STR device suspends its backoff countdown on one channel as soon as it begins receiving a frame on the other channel. This temporary suspension may be performed by a non-STR STA in order to prevent transmitting on channel B, when a frame addressed to it is being received on channel A.

Using information in PHY and MAC headers, a non-STR device can determine whether the frame being received is addressed to itself or not. Accordingly, if the frame is not important and can be discarded, the backoff countdown resumes on channel B, if the medium state determined using 802.11 clear channel assessment mechanism is idle. However, if the frame is indeed addressed to the non-STR device, then backoff countdown on channel B remains suspended until the end of the ongoing frame exchange sequence.

C. Challenges in Non-STR MAP Operation

Multi-channel operation is an attractive feature for applications that demand high throughput and low latency, e.g. augmented reality, virtual reality, etc. To minimize the latency in delivering buffered traffic, a MAP is expected to utilize the first available channel for data delivery.

Figure 3:
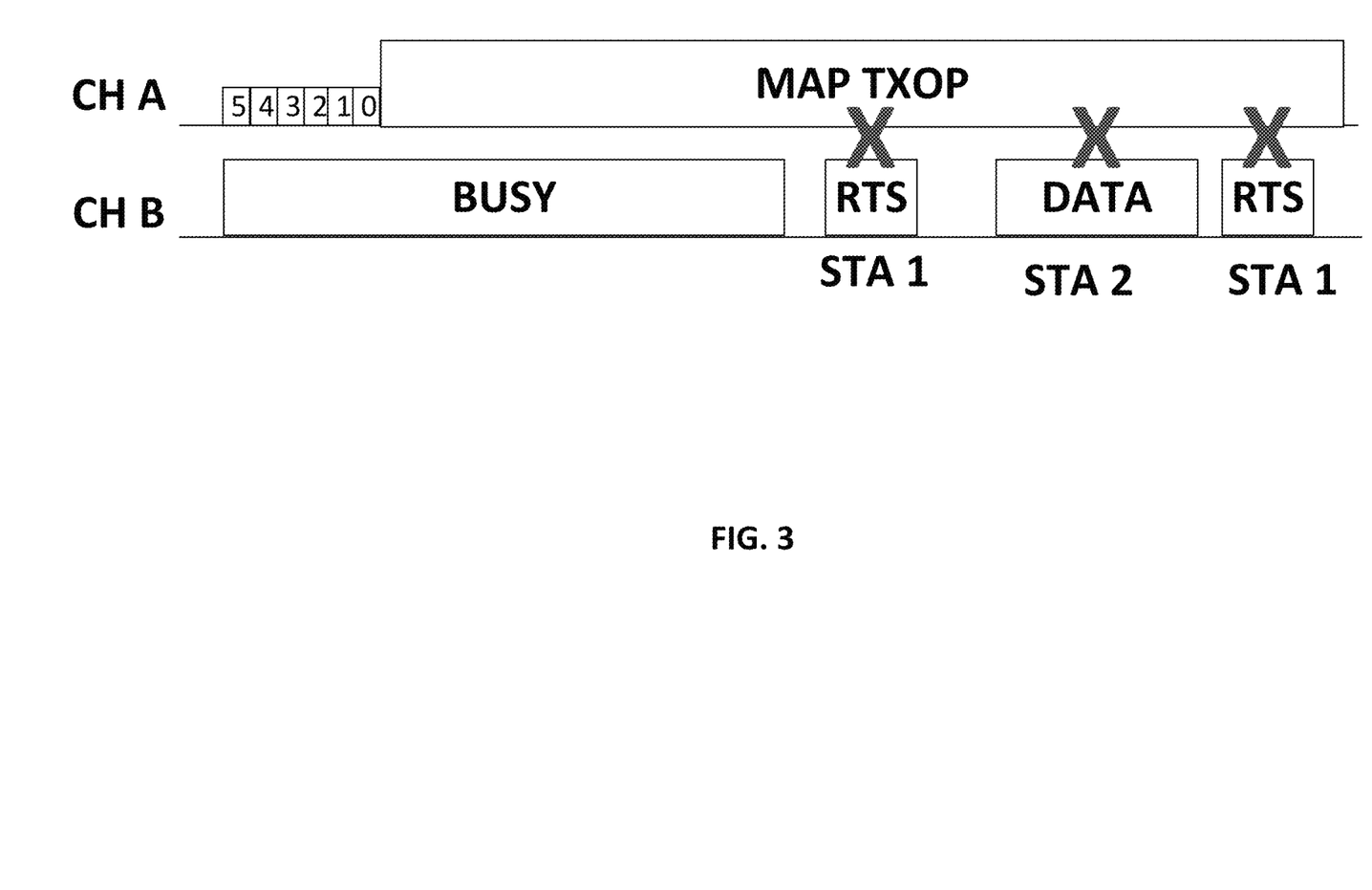
FIG. 3 illustrates challenges involved during a MAP operation.

FIG. 3 illustrates challenges involved during a MAP operation.

Referring to FIG. 3, a MAP obtains medium access on Channel A after its backoff counter value reaches zero. At the same time, the medium state of Channel B is observed to be busy.

During transmission on channel A, the MAP, which is a non-STR device, cannot detect any frames on channel B due to in-device interference, and considers the medium state to be busy. Unfortunately, associated STAs may still attempt transmissions to the MAP during this period, on channel B. The associated STAs includes single channel devices that are not aware of the MAP's multi-channel operation and/or its lack of STR capability. Moreover, this is applicable even to multi-channel devices, which may have switched from sleep state to awake state on channel B during the MAP's transmission on channel A.

In FIG. 3, STA 1 and STA 2, which are single channel STAs associated to the MAP on channel B, attempt request to send (RTS) and data transmissions, respectively, although neither of the STAs receives a response from the MAP. Following the 802.11 medium access rules, STA 1 and STA 2 double their 802.11 contention window and randomly select a new backoff value from the increased range.

However, a larger backoff value leads to an increased delay in medium access, even after the MAP becomes available for reception. As this problem may occur each time the MAP obtains medium access on one of the operating channels, severe performance degradation may occur for the MAP at a network level and the performance gap may increase for multi-channel operations by a regular AP, which is expected to have STR capability. Therefore, an improved medium access protocol for multi-channel MAP operations is still required.

To address these issues, a Mobile AP Medium State-based Transmission Alignment and Recess (MobiSTAR) protocol is provided, in which a MAP opportunistically aligns starting and ending points of transmissions on multiple channels, if available. Alternatively, if only a single channel is available for transmission, the MAP aligns its transmission on that channel with ongoing out of network transmission on the other channel.

Further, to address a scenario in which alignment is not possible at the MAP, e.g., due to a non-Wi-Fi energy received on the other channel, STAs using the MobiSTAR protocol may initiate an access recess timer countdown to limit transmission attempts.

Accordingly, the MobiSTAR protocol improves the downlink throughput delivered by a MAP while minimizing performance degradation in uplink throughput due to the MAP's lack of simultaneous transmission and reception capability.

D. MobiSTAR Transmission Alignment at MAP

This section describes adaptive behavior at a MAP in MobiSTAR upon obtaining medium access on one channel, i.e., upon counting down a backoff value to zero on this one channel. In MobiSTAR, the MAP adapts its transmission on the obtained channel depending on the medium state of the other channel. The adaptive behavior based on the medium state of the other channel may be classified as 1) Medium State is Idle and NAV is zero, 2) Medium State is Busy and non-zero NAV, and 3) Medium State is Busy and NAV is not set, as will be described below.

Medium State is Idle and NAV is zero. In this scenario, a MAP is in the process of performing a backoff countdown on the other channel. Therefore, to boost medium utilization of the non-STR MAP and to prevent some of the problems described above, the MAP may perform aggregated transmission on both channels by aligning starting and ending points of the data frames and the TXOP duration on both channels.

Figure 4:
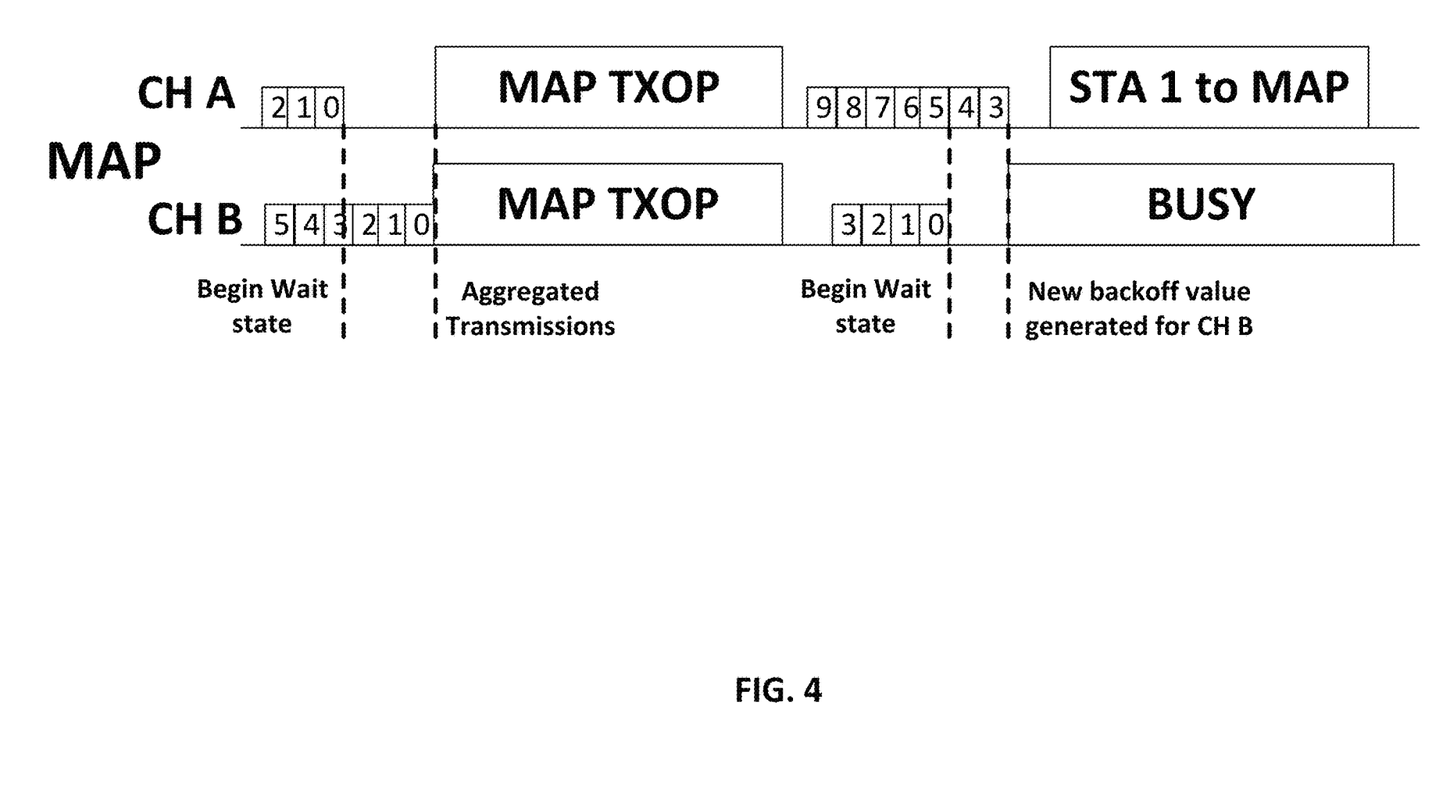
FIG. 4 illustrates transmission aggregation of two channels by a MAP according to an embodiment.

FIG. 4 illustrates transmission aggregation of two channels by a MAP according to an embodiment. Specifically, FIG. 4 illustrates an aggregation approach that retains fairness in medium access with no impact on medium access opportunity of neighboring devices.

Referring to FIG. 4, the MAP, upon counting down the backoff value to zero on Channel A, observes the medium state on Channel B to be idle, but the backoff counter is non-zero, i.e., at 3. Consequently, the MAP enters a waiting state on Channel A and waits for the backoff counter on Channel B to hit zero. When the backoff value on Channel B reaches zero, the MAP begins the aggregated transmissions.

As the MAP is a non-STR device, the frames on both channels are aligned at their start and end points in order to prevent simultaneous transmission and reception. It is important to note that although the frames are aligned in time domain, the PHY data frames sent over the air are separate on each channel and possibly to different STAs in the downlink. Also, as illustrated in FIG. 4, it is possible the channel on which the MAP is in waiting state might get busy before the other channel counts the backoff value down to zero. In this case, a new backoff value is generated without updating the contention window and the medium state is updated to busy. If either or both channels are moderately congested, the probability of gaining access on both channels by the same multi-channel device is low and there is risk of losing access on the channel in waiting state. Therefore, in using the MobiSTAR protocol, the MAP can dynamically perform (i.e., turn on or off) aggregated transmissions depending on traffic conditions.

Different aggregations methods may also be applied.

Medium State is Busy and non-zero NAV. In this scenario, the medium state of the other channel is busy and the MAP's NAV on the other channel has been set due to a received overlapping BSS (OBSS) frame. Because the medium state of the other channel is busy, the MAP cannot perform aggregated transmissions.

To prevent some of the problems described above, the MAP aligns the ending of its TXOP on one channel with the expiry of NAV on the other channel. If ending alignment is not performed and the MAP's TXOP exceeds the NAV set on other channel, STAs may attempt transmissions to the MAP on the other channel during its ongoing transmission.

If the buffered traffic at the MAP requires shorter duration than the NAV set on other channel, then ending alignment is not necessary, and does not have to be performed by the MAP. Additionally, if the transmission time resulting from the above alignment is relatively small compared to the maximum TXOP limit and below a pre-defined threshold, the MAP may enter a waiting state similar to the previous scenario and attempt performing aggregated transmissions.

Figure 5:
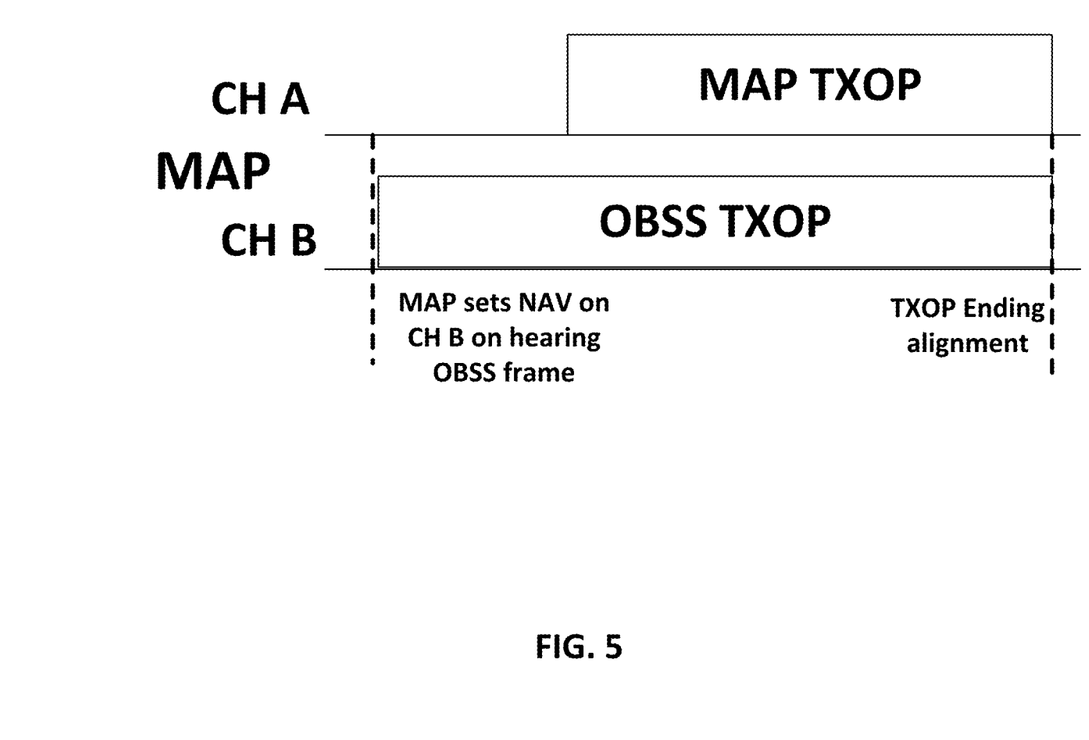
FIG. 5 illustrates alignment of two channels by a MAP according to an embodiment.

FIG. 5 illustrates alignment of two channels by a MAP according to an embodiment. Specifically, FIG. 5 illustrates an operation of a MAP aligning an ending of its TXOP on channel A with a NAV set from a received OBSS frame on channel B. It is important point to note that if the NAV is set on a channel due to an intra-BSS frame from an associated STA to the MAP, then the MAP would not be attempting transmission on the other channel.

Medium State is Busy and NAV is not set. In this scenario, a MAP's medium state on the other channel is busy due to energy received being above the detection threshold, however, the MAP is unable to detect the energy as a valid Wi-Fi transmission. For example, the energy may be from a co-existing technology, such as Bluetooth, radar, etc., or may be a Wi-Fi frame with a received energy that is below the 802.11 packet detection threshold.

Consequently, the MAP does not have knowledge of when the ongoing transmission will end. Therefore, the MAP cannot align its transmission with the ending of ongoing busy state as in previous scenario. Therefore, to maximize the use of the medium access opportunity, the MAP initiates TXOP based on the buffered traffic following the regular 802.11 operation. As no alignment is performed, it is possible for the problems surrounding the enlarged 802.11 contention window to occur. To address this issue, an ad-hoc mechanism that may be utilized by the STAs will be described below.

E. MobiSTAR Access Recess at STA

As described above, the problem scenarios surrounding the enlarged 802.11 contention window are not addressed if a MAP cannot perform alignment of its transmission with the received energy on the other channel. Therefore, to address this scenario, in the MobiSTAR protocol, STAs perform a medium access recess upon failing to receive a response, from a MAP, for their transmission attempt. An STA may also be a single-channel STA, without any knowledge of the ongoing transmissions on other channel.

The STA, upon gaining medium access on a channel, initiates a TXOP with an RTS frame, rather than sending the data frame directly. Upon failing to receive a clear to send (CTS) in response from the MAP and if the medium state is determined to be idle by the STA, the STA identifies that the MAP may be transmitting on the other channel. Accordingly, the STA initiates a recess timer countdown on the attempted channel. For simplicity, this channel on which countdown is initiated is referred to as a recess channel. The recess timer value may be advertised by the MAP in beacons, probe responses, etc., and may be in the order of the 802.11 maximum TXOP limit.

During the recess timer countdown, the STA suspends its 802.11 backoff, but continues to monitor the recess channel. If the STA listens to a frame on a recess channel from the MAP before the timer expires, the STA can suspend the recess timer and resume medium access. However, if the STA listens to a frame from another device in the MAP's BSS on the recess channel, the STA continues the timer countdown and does not update its NAV, because it is likely the MAP may not respond to the other STA as well. However, if the STA listens to a frame from the OBSS on the recess channel identified by BSS color in a PHY header and a TXOP duration computed from the MAC header exceeds the recess timer expiry, the STA updates its NAV on the recess channel and expires the recess timer.

Figure 6:
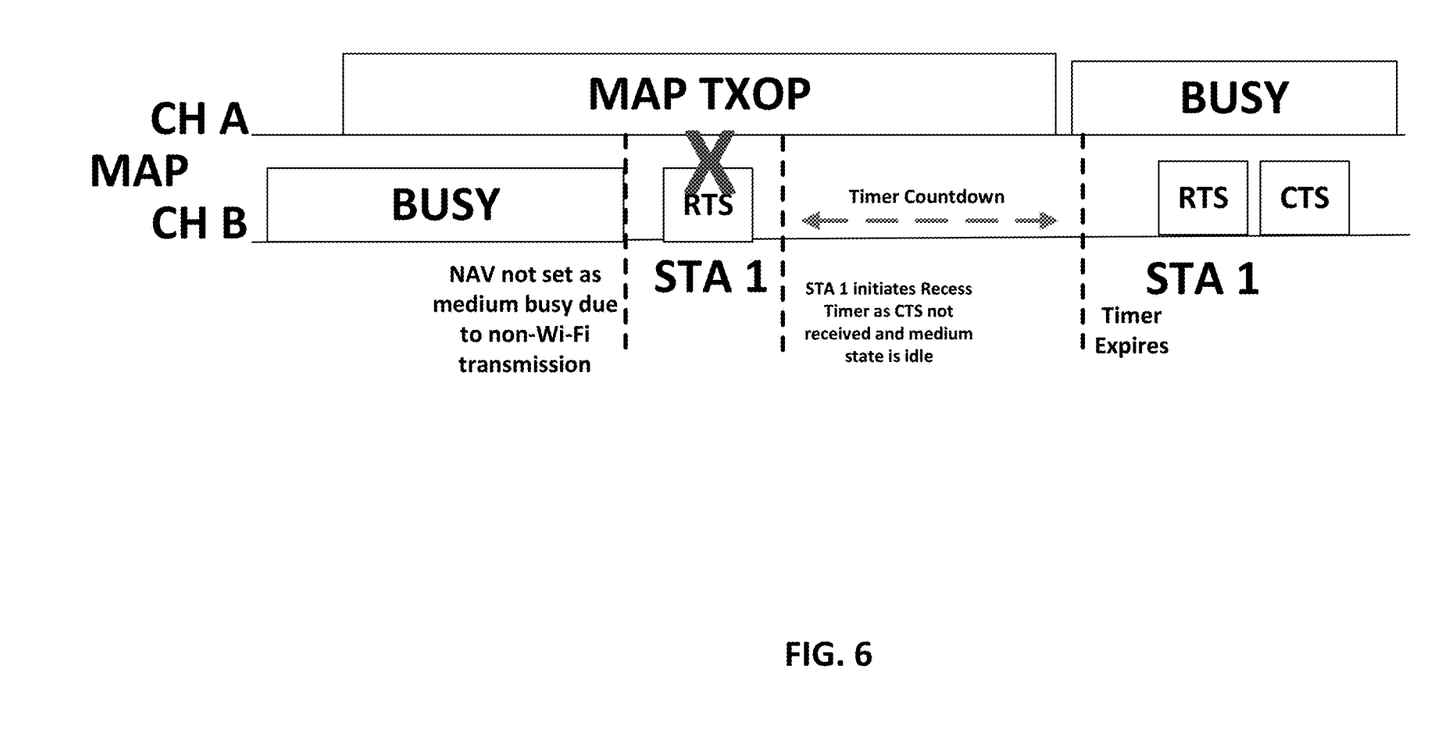
FIG. 6 illustrates an operation for a single channel STA according to an embodiment.

FIG. 6 illustrates an operation for a single channel STA according to an embodiment.

Referring to FIG. 6, the STA 1 attempts RTS on channel B, but no CTS is received and Channel A state is IDLE for point coordination function interframe space (PIFS). The STA 1 activates a recess timer countdown. The STA 1 continues to monitor the Channel A and can have an early timer expiry, if it hears any frame from the MAP, not necessarily to itself. If an OBSS frame is heard during the countdown and the TXOP duration indicates ending after timer expiry, the STA 1 updates its NAV.

By performing medium access recess during the time countdown, performance degradation of STAs is minimized due to the MAP's STR constraint.

To demonstrate advantages of the above-described Mobi-STAR protocol, simulation has been performed including:

1 non-STR MAP and 1 non-STR STA

Associated STAs, OBSS flows, and non-Wi-Fi flows on each channel

Mandatory Channel case, single link STAs use only operate on one channel

Full-buffered traffic in uplink to the non-STR MAP from the STAs

Full-buffered downlink traffic to the non-STR STA from non-STR MAP

OBSS flow and non-Wi-Fi use random time each TXOP 300 us to 5.5 ms

Figure 7:
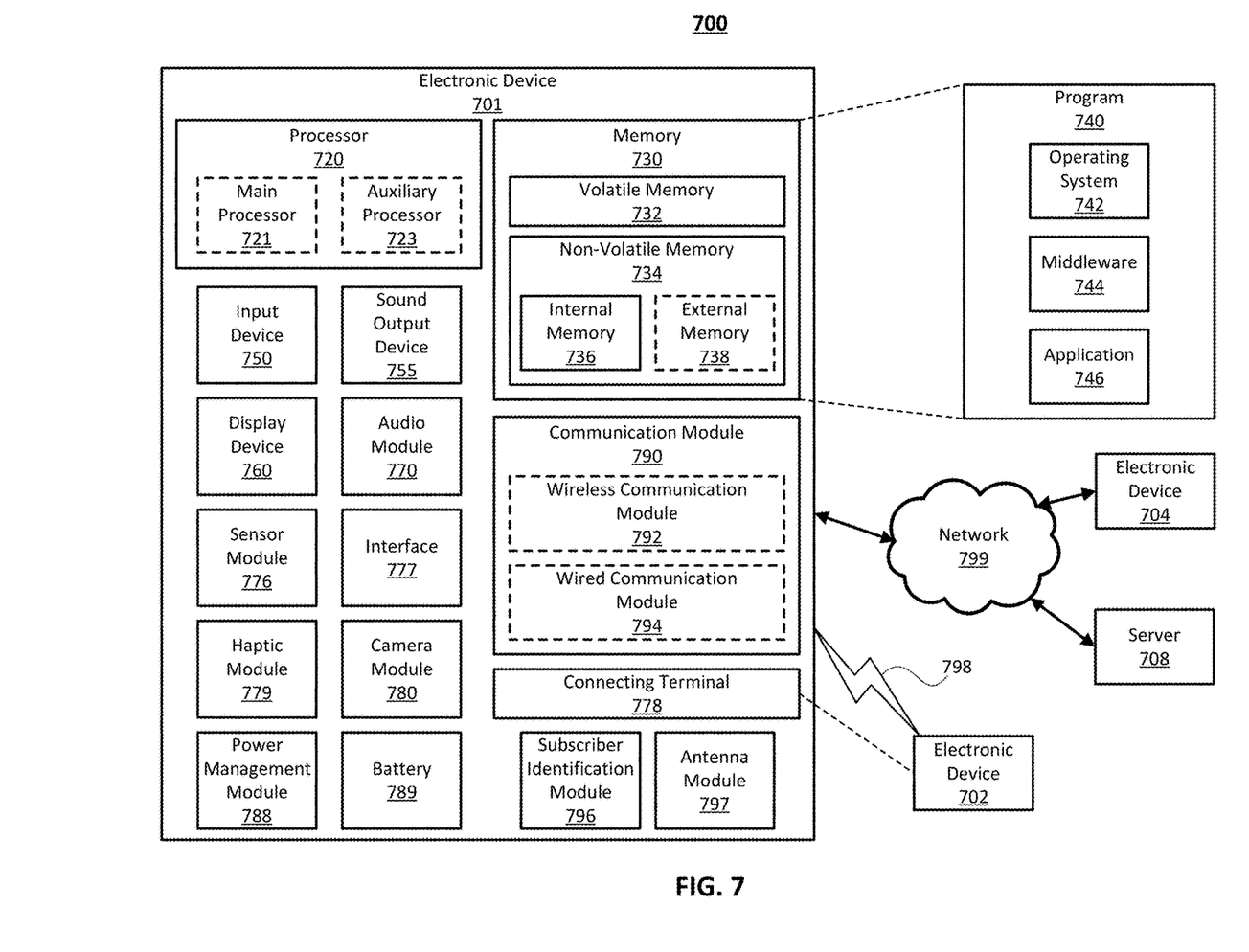
FIG. 7 illustrates an electronic device in a network environment, according to an embodiment.

FIG. 7 illustrates an electronic device in a network environment, according to an embodiment. Specifically, the electronic device in FIG. 7 may be an STA or a MAP.

Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, Wi-Fi direct, or a standard of the Infrared Data Association (IrDA)) or the second network 799 (e.g., a long-range communication network, such as a cellular network, the Internet, or a computer network (e.g., LAN or WAN). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method performed by a non-simultaneous transmission and reception (STR) mobile access point (MAP), the method comprising:
   identifying a medium state of a first channel of the MAP; and
   adapting transmission on a second channel of the MAP, based on the identified medium state of the first channel.

2. The method of claim 1, wherein adapting the transmission on the second channel of the MAP comprises aggregating the transmission on the second channel with transmission on the first channel, in response to a network allocation vector (NAV) being zero and to identifying that the medium state of the first channel is in an idle state.

3. The method of claim 2, wherein aggregating the transmission on the second channel with the transmission on the first channel comprises aligning starting and ending points of data frames and transmission opportunity period (TXOP) durations on the first and second channels.

4. The method of claim 1, further comprising determining that backoff counters for each of the first channel and the second channel have expired, prior to aggregating the transmission on the second channel with the transmission on the first channel.

5. The method of claim 1, further comprising, in response to determining that one of the first channel and the second channel becomes busy, prior to a backoff counter of the other of the first channel and the second channel having expired, generating a new backoff counter value for the backoff counter of the other of the first channel and the second channel.

6. The method of claim 1, wherein adapting transmission on the second channel of the MAP comprises aligning an ending of a transmission opportunity period (TXOP) on the second channel with an expiry of a network allocation vector (NAV) on the first channel, in response to the NAV being non-zero and to identifying that the medium state of the first channel is in a busy state.

7. The method of claim 6, wherein the NAV is set in response to a received overlapping basic service set (OBSS) frame.

8. A non-simultaneous transmission and reception (STR) mobile access point (MAP), the MAP comprising:
   a transceiver; and
   a processor configured to:
      identify a medium state of a first channel of the MAP, and
      adapt transmission on a second channel of the MAP, based on the identified medium state of the first channel.

9. The MAP of claim 8, wherein the processor is further configured to adapt the transmission on the second channel of the MAP by aggregating the transmission on the second channel with transmission on the first channel, in response to a network allocation vector (NAV) being zero and to identifying that the medium state of the first channel is in an idle state.

10. The MAP of claim 9, wherein the processor is further configured to aggregate the transmission on the second channel with the transmission on the first channel by aligning starting and ending points of data frames and transmission opportunity period (TXOP) durations on the first and second channels.

11. The MAP of claim 8, wherein the processor is further configured to determine that backoff counters for each of the first channel and the second channel have expired, prior to aggregating the transmission on the second channel with the transmission on the first channel.

12. The MAP of claim 8, wherein the processor is further configured to, in response to determining that one of the first channel and the second channel becomes busy, prior to a backoff counter of the other of the first channel and the second channel having expired, generate a new backoff counter value for the backoff counter of the other of the first channel and the second channel.

13. The MAP of claim 8, wherein the processor is further configured to adapt the transmission on the second channel of the MAP by aligning an ending of a transmission opportunity period (TXOP) on the second channel with an expiry of a network allocation vector (NAV) on the first channel, in response to the NAV being non-zero and to identifying that the medium state of the first channel is in a busy state.

14. The MAP of claim 13, wherein the NAV is set in response to a received overlapping basic service set (OBSS) frame.

15. A method performed by a non-simultaneous transmission and reception (STR) end user device (STA), the method comprising:
   transmitting, on a first channel, to a mobile access point (MAP), a request to send (RTS) message;
   identifying that no clear to send (CTS) message is received from the MAP, in response to transmitting the RTS message;
   identifying that a medium state of the first channel is idle; and
   activating a recess timer countdown, in response to identifying that no CTS message is received and that the medium state of the first channel is idle.

16. The method of claim 15, further comprising:
monitoring a second channel of the MAP for a frame from the MAP; and
cancelling the recess timer countdown, in response to identifying the frame from the MAP.

17. The method of claim 16, further comprising updating a network allocation vector (NAV) of the first channel, in response to the identified frame being an overlapping basic service set (OBSS) frame.

18. A non-simultaneous transmission and reception (STR) end user device (STA), the STA comprising:
a transceiver; and
a processor configured to:
transmit, via the transceiver, on a first channel, to a mobile access point (MAP), a request to send (RTS) message;
identify that no clear to send (CTS) message is received from the MAP, in response to transmitting the RTS message;
identify that a medium state of the first channel is idle; and
activate a recess timer countdown, in response to identifying that no CTS message is received and that the medium state of the first channel is idle.

19. The STA of claim 18, wherein the processor is further configured to:
monitor a second channel of the MAP for a frame from the MAP; and
cancel the recess timer countdown, in response to identifying the frame from the MAP.

20. The STA of claim 19, wherein the processor is further configured to update a network allocation vector (NAV) of the first channel, in response to the identified frame being an overlapping basic service set (OBSS) frame.

* * * * *